US010216812B2

(12) United States Patent
Witkop et al.

(10) Patent No.: US 10,216,812 B2
(45) Date of Patent: Feb. 26, 2019

(54) APPLICATION PROGRAMMABLE INTERFACE (API) DISCOVERY

(71) Applicant: HEWLETT PACKARD ENTERPRISE DEVELOPMENT LP, Houston, TX (US)

(72) Inventors: Steven Witkop, Clinton Township, MI (US); Martin Robert Neuhard, Vestal, NY (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 62 days.

(21) Appl. No.: 15/031,771

(22) PCT Filed: Oct. 30, 2013

(86) PCT No.: PCT/US2013/067627
§ 371 (c)(1),
(2) Date: Apr. 25, 2016

(87) PCT Pub. No.: WO2015/065398
PCT Pub. Date: May 7, 2015

(65) Prior Publication Data
US 2016/0267153 A1    Sep. 15, 2016

(51) Int. Cl.
*G06F 17/30* (2006.01)
*G06F 21/62* (2013.01)
(Continued)

(52) U.S. Cl.
CPC ........ *G06F 17/30557* (2013.01); *G06F 17/30* (2013.01); *G06F 17/30106* (2013.01);
(Continued)

(58) Field of Classification Search
CPC ......... G06F 17/30557; G06F 17/30106; G06F 17/30598; G06F 21/6218; G06F 9/54; G06F 9/5005; G06Q 40/06
See application file for complete search history.

(56) References Cited

U.S. PATENT DOCUMENTS 7,716,357 B2    5/2010  Milligan et al.
8,180,849 B2    5/2012  Viegener et al.
(Continued)

FOREIGN PATENT DOCUMENTS

IN    140/DEL/2010    7/2011

OTHER PUBLICATIONS

PCT Search Report/Written Opinion ~ Application No. PCT/US2013/067627 dated Jul. 25, 2014 ~ 9 pages.
(Continued)

*Primary Examiner* — Umut Onat
(74) *Attorney, Agent, or Firm* — Brooks, Cameron & Huebsch, PLLC

(57) ABSTRACT

An example system may include an application programmable interface (API) discovery component to employ a plurality of different search strategies to search a plurality of storage environments to discover APIs associated with an enterprise; an API assessment component to classify the discovered APIs according to a taxonomy of API contexts and store at least a portion of the classified APIs in an API information repository; and an API management component to provide user devices with authorized access to the classified APIs in the API information repository via an API gateway.

15 Claims, 7 Drawing Sheets

(51) Int. Cl.
*G06Q 40/06* (2012.01)
*G06Q 10/00* (2012.01)
*H04L 29/08* (2006.01)
*H04L 29/06* (2006.01)

(52) U.S. Cl.
CPC .. *G06F 17/30598* (2013.01); *G06F 17/30705* (2013.01); *G06F 17/30734* (2013.01); *G06F 17/30997* (2013.01); *G06F 21/629* (2013.01); *G06F 21/6218* (2013.01); *G06Q 10/00* (2013.01); *G06Q 40/06* (2013.01); *H04L 67/16* (2013.01); *H04L 63/102* (2013.01)

(56) References Cited

U.S. PATENT DOCUMENTS

| | | | |
|---|---|---|---|
| 8,489,759 | B2 | 7/2013 | Parham et al. |
| 9,077,773 | B2* | 7/2015 | Marietti ................. H04L 65/40 |
| 2007/0033167 | A1 | 2/2007 | Basu et al. |
| 2007/0282879 | A1 | 12/2007 | Degenkolb et al. |
| 2009/0055345 | A1 | 2/2009 | Mehta et al. |
| 2009/0235285 | A1* | 9/2009 | Kim ................. G06F 17/30961 719/328 |
| 2011/0231473 | A1 | 9/2011 | Narayanan et al. |
| 2012/0159570 | A1 | 6/2012 | Reierson et al. |
| 2012/0296929 | A1 | 11/2012 | Hossain et al. |
| 2013/0132584 | A1 | 5/2013 | Palladino et al. |
| 2013/0290932 | A1* | 10/2013 | Kruglick ............. G06F 11/3672 717/124 |
| 2014/0208296 | A1* | 7/2014 | Dang ....................... G06F 8/75 717/123 |
| 2015/0082441 | A1* | 3/2015 | Gathala ................ G06F 9/541 726/25 |

OTHER PUBLICATIONS

Sivashanmugam, K. et al.; "Metadata and Semantics for Web Services and Processes"; Oct. 9-26, 2003; 19 pages.
International Preliminary Report on Patentability received for PCT Patent Application No. PCT/US2013/067627, dated May 12, 2016, 6 pages.

* cited by examiner

APPLICATION PROGRAMMABLE INTERFACE (API) DISCOVERY

BACKGROUND

The ability of project teams to efficiently find available services, to understand what the services do, and to determine any benefit provided to projects may well determine how likely the project teams are to realize a reuse value of the services. Universal Description, Discovery and Integration (UDDI) registries support this goal. Web Service Definition Language (WSDL) documents are designed to be machine readable and, while they can be readable by humans, developers looking to consume services typically require more information than made available by WSDL documents alone. Many services of value exist inside and outside a large organization.

BRIEF DESCRIPTION OF THE DRAWINGS

For a more complete understanding of various examples, reference is now made to the following description taken in connection with the accompanying drawings in which.

DETAILED DESCRIPTION

Figure 1:
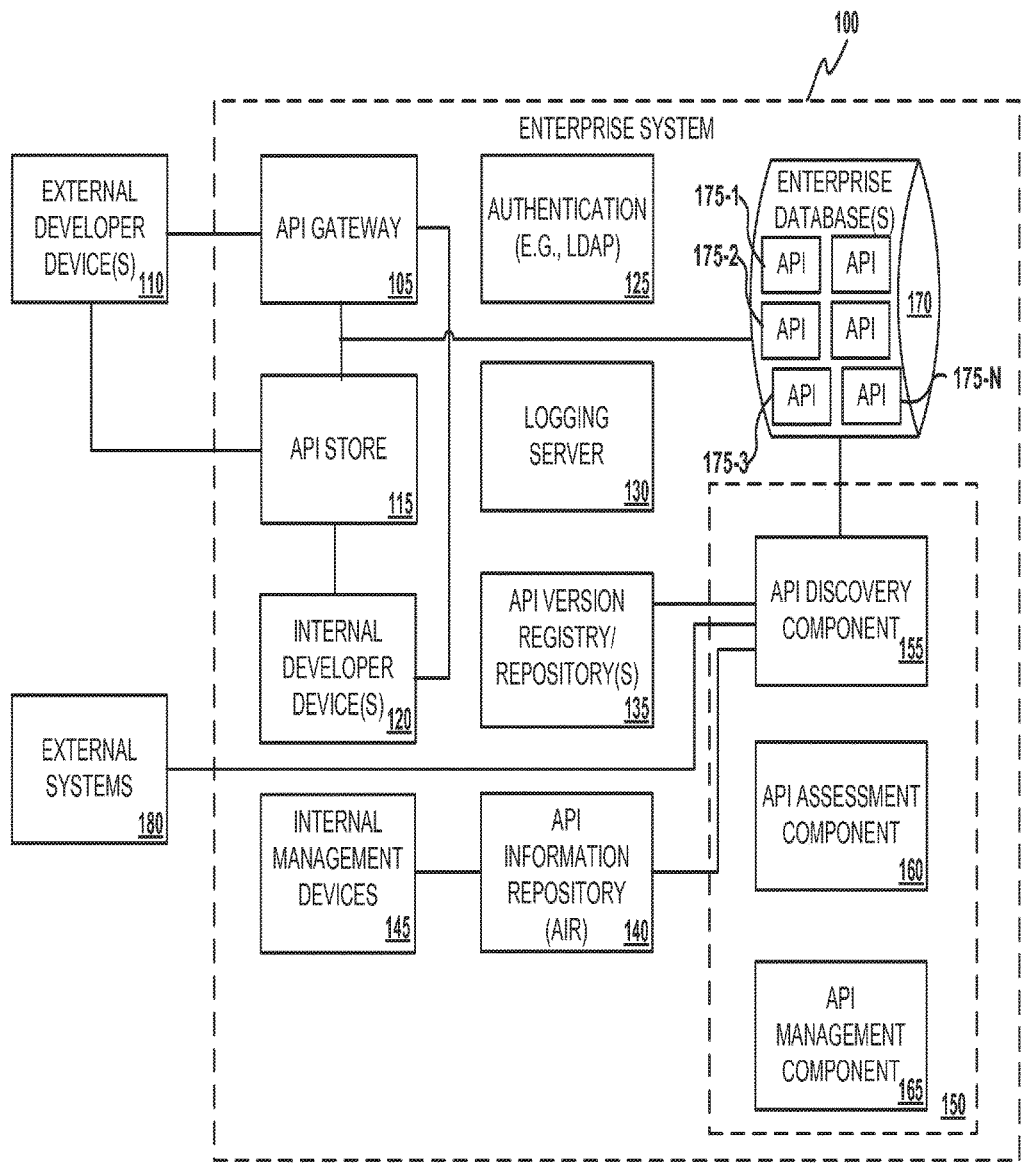
FIG. 1 illustrates an example system that may be used for automated management of APIs.

As noted above, many services of value exist inside and outside a large organization. Determining what these services are for a given organization, securing and exposing them to the right community are key challenges.

Discovering and categorization of Application Programming Interfaces (APIs), particularly web based APIs, is a continuing issue for enterprises, and it is only increasing in importance with the advent of cloud based computing and the proliferation of software as a service (SAS). Systems and methods described herein include service discovery functions, automated correlation and classification methods, data refinement and control functions for using the resulting service information to populate an API service gateway, and techniques for utilizing a collaboration space (e.g., an API store) to manage and expose those services to extended enterprise developers. Such systems and methods may provide a way to utilize APIs that removes the reliance on manual categorization of business capabilities.

Discovering services provided on the Internet is no longer a function of service registries alone. Systems and methods described herein can be effective in collecting data about web accessible services available inside and outside an enterprise. In addition, the systems and methods described herein may be used to provide correlation and other classification techniques to assess the accessible services from an extended enterprise point of view. Still further, the systems and methods may use the resulting classified service information to populate an API Store accessible via an API service gateway in order to provide a collaboration space to manage and expose those services to extended enterprise developers including, for example, value-chain suppliers/partners, employees, customers and marketplace customers.

Systems and methods described herein may allow an enterprise to achieve greater optimization of services and innovations by utilizing a developer-centric open and/or curated innovation platform sitting between the enterprise and its suppliers/partners, employees, customers and the marketplace. The systems and methods may enable an enterprise to reduce millions of dollars of investment capital put at risks each year while also increasing innovation speed to market. Various examples described herein may enable an enterprise to:

Reduce risky R&D investments and improve innovation speed to market.

Capture business capability data across geographies and organizational boundaries to identify and eliminate areas of waste.

Extend the life of your differentiated business capabilities and increase revenues by engaging the digital economy with less risk.

In order to create a solution that is able to accommodate large enterprise customers, various examples described herein may leverage open source, internal or external products and technologies. The systems and methods may provide multiple approaches for service detection, discovery, assessment, and management. In some examples, the systems and methods described herein may utilize an assessment approach that applies both outside-in and inside-out value-chain thinking To use an analogy, the disclosed examples may collect a large amount of data into a haystack and finds the needles. Those needles are then organized and put into a store front. From that store front, developers including partners/suppliers, employees, customers and the marketplace users can stop in and pick up supplies needed to craft innovative solutions.

FIG. 1 illustrates an example enterprise system 100 that may be used for automated management of APIs for an enterprise. The enterprise system 100 provides an API gateway 105 to provide for secure access to enterprise information for external developer devices 110 as well as internal development devices 120. The enterprise system 100 also provides an API store 115 that, after external or internal developer devices 110 and 120 have been authenticated by the API gateway 105, provides controlled access to various APIs that have been discovered, assessed and managed by an automated API subsystem 150.

The enterprise system 100 may also include a security component 125, a logging component 130, an API version registry/repository component 135, an API information repository (AIR) component 140, one or more internal management devices 145, an automated API subsystem 150 and one or more enterprise databases 170. The individual components 105, 115, 125, 130, 135, 140, 145, 150 and 160 of the enterprise system 100 may each be implemented on individual servers, each server device including one or more central processing units and memory (e.g., random access memory (RAM) and read-only memory (ROM)). Alternatively, one or more of the components 105, 115, 125, 130, 135, 140, 145, 150 and 160 may be integrated onto a single server device.

The automated API subsystem 150, in this example, includes an API discovery component 155, an API assessment component 160 and an API management component 165. The API discovery component 155, the API assessment component 160 and the API management component 165, in one example, may each include at least one server device. Alternatively, two or more of the API discovery component 155, the API assessment component 160 and the API management component 165 may be integrated into a single server device. Various portions of the API discovery component 155, the API assessment component 160 and the API management component 165 may be embodied as virtualized stacks that may be deployed in various locations of an Enterprise infrastructure or deployed in the cloud to take advantage of elastic processing power.

The API discovery component 155 may include computer program code to cause one or more CPUs associated with the API discovery component 155 to perform discovery functions. A simple web search may not be enough for service discovery. Service information may be kept in many different types of repositories such as: code, UDDI, WSDL, Domain Name System (DNS), logs as well as documents. To search all of this information many different tools may be utilized. The computer program code may cause the API discovery component 155, and the one or more associated CPUs to dynamically discover information related to API services using, for example, open-source spiders, crawlers, bots, search engines, domain name system (DNS) analysis, publish-subscribe services, and agents of all types.

One of the objectives of the dynamic discovery approach is to develop a rich repository of data to be used as raw materials available both within the enterprise system 100 and external to the enterprise system 100. The rich repository of data may be stored in the API information repository (AIR) component 140 and version information pointing to different versions of different APIs in the AIR component 140 may be stored in the API version registry/repository 145. The API discovery component 140 may be communicatively coupled to the enterprise databases 170, the AIR component 140, the API version registry/repository 145 and external systems 180 in order to discover the API data. The computer program code of the API discover component 155 may provide for a discovery framework including one or more of open source, bespoke (custom made) and COTS (commercial-off-the-shelf) products installed on a VM (virtual machine) with a single point of entry for the interrogation of various components of the enterprise system 100 as well as the external systems 180.

In order to create this rich repository of data the API discovery component 155 may employ a variety of different search strategies directed to the multiple environments and technologies employed in the enterprise system 100 and the external systems 180. For example, the search strategies may be directed to discover enterprise APIs 175-1, 175-2 through 175-N in the enterprise databases 170. These different search strategies may be contained in what may be referred to as environment cartridges and technology cartridges, referred to collectively as search cartridges. Environment cartridges may include properties files that search criteria indicative of the physical environment data of different API environments. Technology cartridges may include properties files that contain search criteria for API different technologies, media types and protocols.

Table 1 lists examples of five search cartridges directed to different API technologies that may be employed in the various computing environments of the enterprise system 100 and/or the external systems 180. The search cartridges shown in Table 1 each include various search criteria. The search criteria may be embodied as XML properties files that define the search criteria based on network data, service technologies, media types, protocols etc. These search cartridges are may be fed into the different search tools described above through respective APIs and the results may be used for populating a precursor to the AIR component referred to as the Raw API information repository (R-AIR) component 140' (shown in FIG. 3 and described below).

TABLE 1

| Cartridge | Search Criteria | Number of Hits | | |
|---|---|---|---|---|
| | | Enterprise #1 | Enterprise #2 | Enterprise #3 |
| SOAP | WSDL | 16 | 0 | 1397 |
| | SOAP-ENV | 0 | 0 | 1 |
| | Schemas.xmlsoap.org | 1 | 0 | 0 |
| REST | json | 28 | 63 | 1741 |
| | application/json | 19 | 45 | 1002 |
| | atom | 1055 | 1132 | 1226 |
| XML/ | ?xml | 3 | 2 | 48 |
| HTTP | XMLHttpRequest | 2 | 11 | 160 |
| | AJAX | 58 | 86 | 1223 |
| RPC | RPC(tcp.port==135) | 0 | 0 | 0 |
| General | <company name (e.g., Enterprise #1) & api> | 1644 | 3330 | 11366 |
| | api | 1663 | 5199 | 12012 |
| | xml | 312 | 3399 | 2514 |

The search cartridges in Table 1 include a SOAP (Simple Object Access Protocol) cartridge, a REST (Representational State Transfer) cartridge, an XML/HTTP (Extensible Markup Language Hypertext Transfer Protocol) cartridge, an RPC (remote procedure call) cartridge and a general cartridge.

SOAP is a protocol specification for exchanging structured information in the implementation of Web services. SOAP relies on XML Information Set for a message format and usually relies on HTTP or SMTP (Simple Mail Transfer Protocol) for message negotiation and transmission. The search criteria for the SOAP cartridge may include searching for character strings including, but not limited to, "WSDL" (Web Services Description Language), "SOAP-ENV" and "Schemas.xmlsoap.org." The "WSDL" string may appear as a file name extension or in an internet media type designation. The "SOAP-ENV" string may appear in the envelope of an XML document making up a SOAP message in network traffic. The "Schemas.xmlsoap.org" string is a string that may appear in a header of a file that includes a WSDL functionality description for an API. WSDL is often used in combination with SOAP and an XML schema to provide Web services via a Web API over the internet. A client program may read a WSDL file to determine what operations are made available by the API. The SOAP cartridge search strings shown in Table 1 are not an exhaustive list and other SOAP related strings may be used.

REST is an architectural style that has emerged as a predominant Web API design model. The search strings for the REST cartridge in Table 1 include "json", "application/json" and "atom". The "json" string may be found as a file extension in a JSON file that may be used in a REST data exchange to transmit part of a database for a server to a client. The "application/json" string is an internet media type identifier that may appear in a REST message. The "atom" string may appear as a file extension or as an Internet media type identifier in for REST related APIs that utilize the Atom Syndication Format standard controlled by the IETF Atom Publishing Format and Protocol Workgroup. The REST cartridge search strings shown in Table 1 are not an exhaustive list and other REST related strings may be used.

XML/HTTP a set of APIs that enables XML, HTML or binary data to be transmitted to and from Web servers over the Internet to clients using HTTP. XML/HTTP objects on a client may continuously query the server transparently to retrieve the latest information without a user having to repeatedly refresh the browser. As shown in Table 1, the XML/HTTP cartridge may search for strings including, but not limited to "?xml", "XMLHttprequest" and "AJAX". The "?xml" search criteria searches for an xml value that may be found in documentation affiliated with XML over an HTTP request. The question mark "?" in the "?xml" string is an indication that the search criteria is a url string that has an xml value in the "GET" portion of the URL. This may be indicative that the request is delivering XML to either the server or the client. The "XMLHttpRequest" string may appear in a header of an XMLHttpRequest type of API. XMLHttpRequest is a set of APIs that can be used by Web browser scripting languages, such as JAVASCRIPT, a programming language, to transfer XML and other text data to and from a Web server using HTTP. XMLHttpRequest works by establishing a communication channel between a Web page's client-side and server-side. The "AJAX" string may appear in an XMLHttpRequest API header utilizing the AJAX technology. The "AJAX" string may also be found in JAVASCRIPT functions. AJAX, which stands for Asynchronous JAVASCRIPT and XML, is a technology using a number of existing technologies together, including, for example, HTML or XHTML, Cascading Style Sheets, JAVASCRIPT, the Document Object Model, XML, XSLT, and the XMLHttpRequest object. When these technologies are combined in the AJAX model, Web applications are able to make quick, incremental updates to the user interface without reloading the entire browser page. Any identified AJAX code may be opened to be viewed and searched via web crawlers. The XML/HTTP cartridge search strings shown in Table 1 are not an exhaustive list and other related strings may be used.

An RPC, or remote procedure call, is an inter-process communication that allows a computer program to cause a subroutine or procedure to execute on another computer or network. Typically, an RPC is initiated by a client device which sends the RPC request message to a known remote server to execute a specified procedure with supplied parameters. By searching network traffic for the "RPC(tcp.port-135)" string, a Remote Procedure Call could be considered a call to an internal API's and therefore may identify a potential API candidate to assess. The RPC cartridge search strings shown in Table 1 are not an exhaustive list and other related strings may be used.

The general cartridge shown in Table 1 includes other strings that may be searched for to identify APIs. The <company name (e.g., Enterprise #1) & api> string signifies a generic search criteria that searches for messages and/or files that include both a specified "company name" and the string "api". Such a message or file has a high probability of being an API file or a message related to an API. Similarly, the strings "api" and "xml" may also have high probabilities of being located in messages or files associated with APIs. The General cartridge search strings shown in Table 1 are not an exhaustive list and other related strings may be used.

The search cartridges included in Table 1 are not a static set. The types of cartridges utilized to search for APIs may be expanded to include new cartridges to look for new signatures based on new words or a new signature, or a new symbol to optimize searching as new technologies are created.

The API discovery component 155 may search the Enterprise databases 170, including the APIs 175-1 to 175-N, and databases of the external systems 180 using the cartridges and related search criteria listed in Table 1. In addition, the API discovery component 155 may search, in real time, network traffic to and from the external developer devices 110, the internal development devices 120 and the other components of the enterprise system to identify messages that include any of the search criteria listed in Table 1. The resulting APIs identified by these searches may be stored in the AIR component 140 as a Raw API Information Repository (R-AIR) 140' (described in reference to FIGS. 2 and 3 below).

For UDDI searching a tool called UDDI Explorer supports searching UDDI registries. For Network traffic searching, tools such as HP Universal Discovery, HTTP Network Sniffer, Netmon and WireShark may be used. A large amount of information may be available in network traffic. An issue in searching some network traffic may involve security access to the data packets within the network traffic. For WSDL searching, tools such as MS Disco, and WS-Discovery tools such as CxF from Apache may be used.

The API assessment component 160 may include computer program code to cause one or more CPUs associated with the API assessment component 160 to perform assessment functions associated with the various APIs discovered by the API discovery component 155 and stored in the R-AIR 140'. The API assessment component 160 may implement an information platform that automates the creation of a taxonomy used for de-duplication of like services, securitizing of data, and deprecating business capabilities. Deprecating business capabilities may include removing business capabilities that are no longer utilized (e.g., are outdated or have been replaced) or are duplicates of other business capabilities. When a business capability is removed, the system may let the users of those business capabilities know, by an automated announcement for example, that the business capabilities may no longer be supported and may be eventually retired. The taxonomy may act as a knowledge base for the API assessment component 160 to perform correlation and coordination useful to manage the APIs.

In performing de-duplication, the API assessment component 160 may identify different APIs that perform essentially, or exactly, the same functions. This may be accomplished by grouping or clustering the APIs in the R-AIR 140—using classification schemes that will be discussed below. The API assessment component 160 may store both versions of identified "duplicate" APIs and then let the market decide which one should be deleted by performing analytics on the "duplicate APIs to see which is used more often or has differentiating features. The classification scheme may include a list of categories and APIs that have previously been grouped into the categories. The taxonomy may also include functions performed by the grouped APIs in each category.

By correlating functions performed by a newly discovered API with functions associated with the existing categories, the API assessment component 160 can classify the newly discovered API into one of the existing categories of the taxonomy. Similar APIs may be pruned in the de-duplication process. The classified and de-duplicated APIs may then be stored in the AIR component 140 in order to be accessed by internal developer devices 120 and external development devices 110. In addition to storing the classified and de-duplicated APIs in the AIR component 140, the API assessment component 160 may store links to the APIs in the AIR component 140 in the API version registry/repository 135. The API assessment component 160 may also determine which groups, e.g., technology groups, business groups, etc., of external and internal developer devices 110 and 120 may access the APIs in the AIR component 140, thus providing improved security.

The classification, de-duplication and securitization information provided by the assessment component 160 may help in turning the raw services related data discovered by the API discovery component 155 into information useful for producing relevant content for value chain optimization and identifying little used or duplicate business capabilities. The information that is placed in the AIR component 140 is used to dynamically maintain content in the API store 115 accessed via the API gateway 105.

The API management component 165 may include computer program code to cause one or more CPUs associated with the API management component 165 to perform management functions associated with the various APIs stored in the AIR component 140. The API management component may control the functions performed by the API gateway 105, the security component 125 and the logging component 130. The types of functions that the gateway may provide, which may be controlled by the API management component 165, may include access control (e.g., filtering traffic so only authenticated/authorized traffic gets through), rate limiting (e.g., restricting how much traffic can be sent by each external developer device 110 and/or internal development device 120 in association with each API), analytics/metrics capture and logging in the logging server component 130 (tracking what's going on with each of the APIs), security filtering (e.g., checking the content on incoming messages for attacks), and redirection/traffic routing (e.g., sending traffic to different endpoints in the infrastructure of the enterprise system 100 depending on the sender or the request). The API gateway 105 may perform as a set of modules and filters that treat the traffic as it flows through it at high speed. The API management component 165 may be configured to allow users of internal management devices 145 to control the settings of parameters of the modules/filters in order to achieve the desired traffic control.

The securitization information resulting from the assessments performed by the API assessment component 160 may be used by the API management component 165 to manage services. For example, service settings such as security roles, transformations and throttling parameters may be determined based on which groups were determined to require or be allowed access to specific APIs. A properly managed API gateway 105 secures and protects API resources in the AIR component 140 that are accessible to both internal and external developers and may allow for extended enterprise innovation. Monitoring dashboards and reports provided by the API management component 165 may provide useful data for ongoing value chain optimizations adding more data for ongoing assessment activities.

In addition to controlling the security aspects of APIs in the enterprise system 100, the API management component 165 may also control the way that the APIs in the AIR component 140 are exposed to both the internal and external developers via the API store 115. The API management component 165 may include computer program code to cause one or more CPUs associated with the API management component 165 to perform the functions associated with providing access to the APIs at the API store 115. The API store 115 may be a central web page in the enterprise system 100, or may be distributed over several web pages. The API store 115 allows for publishing, consuming and managing APIs via the developer community, both internal and external developers.

The API store 115 may be a type of social and self-service API exchange used by various types of developers, suppliers/partners, employees, customers, and marketplace users to access service specifications, how to guides and collaboration tools used to sustain innovation and continuously update knowledge content.

The AIR component 140 may serve as the central source for APIs that are exposed via the API store 115. The AIR component 140 may be updated manually or through automated discovery, as described above. As new APIs are added, either manually or automatically, to the AIR component 140, the API store 115 web page(s) may be modified in order to expose these new APIs. Thus, the API store 115 is also a dynamically changing entity. The API store 115 and the API gateway 105 may be controlled together. For example, exposure data obtained with the API store 115 may be used to modify the security parameters controlling the security of the API gateway 105. Similarly, the security information obtained with the API gateway 105 may be used to modify the way that certain APIs are displayed in the API store 115.

The functions performed by the automated API subsystem 150 may provide several advantages to the enterprise system 100. For example, the API discovery component 155 may take the burden off of developers and system operators to update the registries/repositories since the AIR component 140 may be automatically updated. In addition, previously created, but undocumented services may be discovered and categorized automatically, thereby uncovering services that may have otherwise gone unused. The automated API discovery can be applied internally to create a competitive advantage for the enterprise system 100 through the exposure of internal business capability to internal developers. The automated discovery may also be used to identify duplicate APIs of the external systems 180 that are being using internally in the enterprise system 100. Duplicate external APIs could be limited to a single external provider in order to provide the best service at the best price. The automated management and exposure function provided by the API management component 165 may be used to publish APIs that are part of commercial software products, giving the commercial software products an out of the box store front, the API store 115, to help differentiate the commercial software products.

Figure 2:
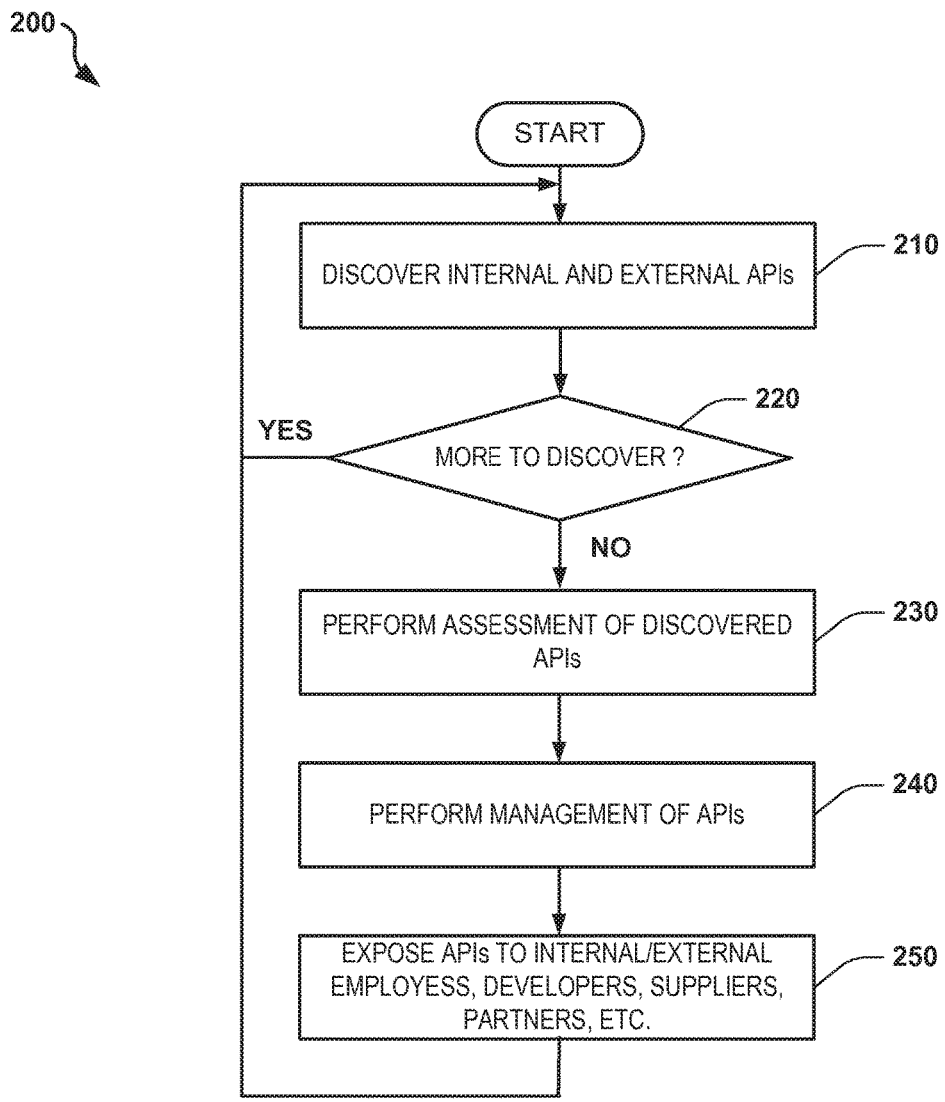
FIG. 2 illustrates an example process that may be used for automated management of APIs.

FIG. 2 illustrates an example process 200 that may be used for automated management of APIs. In various examples, the process 200 can be performed, at least in part, by various components of the enterprise system 100 as described above with reference to FIG. 1. The process 200 will be described with further references to FIG. 1.

In the example illustrated in FIG. 2, the process 200 may begin with the API discovery component 155 discovering APIs internal to the enterprise system 100 at block 210. In addition, the API discovery component 155 may discover APIs external to the enterprise system 100 such as, for example, in the external systems 180.

As described above, the API discovery component 155 may search for metadata associated with APIs in order to discover APIs in the enterprise system 100, such as the APIs 175 in the databases 170, as well as APIs in the external systems 180. The searching may include searching for strings associated with the multiple environment and technology cartridges as shown in Table 1 and described above. The searching can be carried out by searching for files in known directories within the databases 170 and in the external systems 180. However, network traffic between the external developer devices, 110 and the internal developer devices 120 and the other components of the enterprise system 100 and the external systems 180 can also be searched to identify other unknown directories that may include APIs. The network traffic may contain API signatures to enable the API discovery component 155 to find API directories which may then be searched to identify APIs. In this way, the API discovery component may discover APIs anywhere within the enterprise system 100 or the external systems 180.

Figure 3:
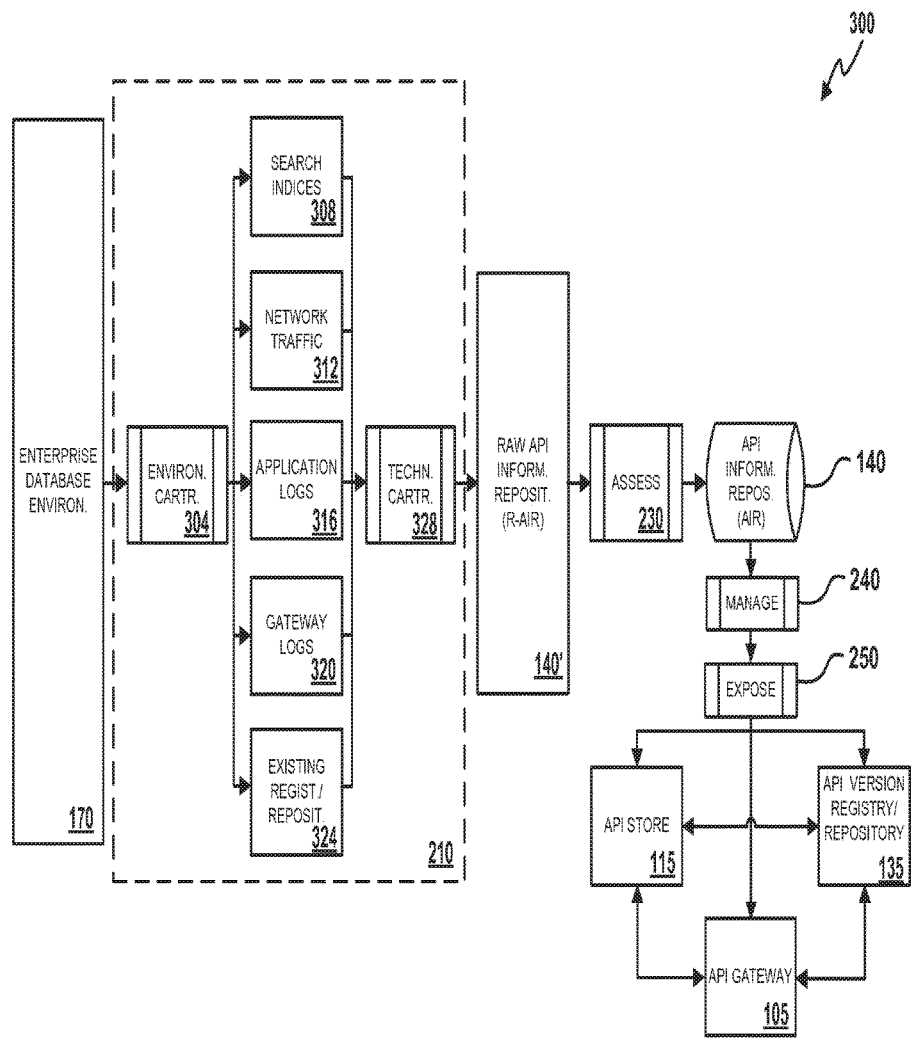
FIG. 3 illustrates an example functional flow diagram showing example functions that may be performed in the process of FIG. 2.

FIG. 3 illustrates an example functional flow diagram 300 showing example functions that may be performed in the process 200. With further reference to FIG. 3, environmental cartridge screening 304 may be used to identify API references in several environments of the enterprise databases 170. The environmental cartridges may utilize search indices 308, such as the search indices shown in Table 1, in order to identify API references within network traffic 312, in application logs 316, in gateway logs 320 (logs kept in the API gateway 105 or other similar gateways, for example), or in existing registers/repositories separate from the registry/repository of the AIR component 140. After identifying references to APIs within the different environments 312, 316, 320, 324, or other environments, technical cartridge screening may be used to further search within newly identified directories and previously known directories for any APIs using any of the API technologies described above in reference to Table 1.

Figure 4:
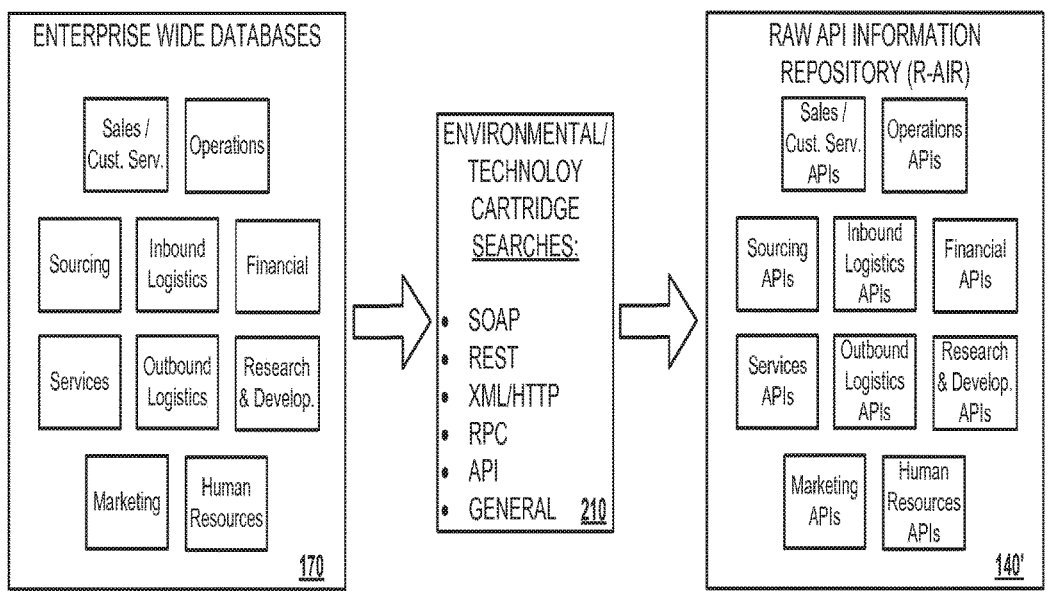
FIG. 4 illustrates example databases within enterprise databases that may be searched during discovery of APIs.

FIG. 4 illustrates example databases within the enterprise databases 170 that may be searched during discovery of APIs at block 210 and the resulting groups of raw APIs that may be subsequently stored in the R-AIR 140'. The databases shown in FIG. 4 are example only and include a sales/customer service database, an operations database, a sourcing database, an inbound logistics database, a financial database, a services database, an outbound logistics database, a research and development database, a marketing database and a human resources database. After identifying APIs in one or more of the enterprise databases 170, the API discovery component 155 may store the APIs from each individual database into a corresponding group in the R-AIR 140', as shown in FIG. 4. The R-AIR 140' may be stored within the AIR component 140 or in separate storage. These API groups in the R-AIR 140', in this example, include a sales/customer service API group, an operations API group, a sourcing API group, an inbound logistics API group, a financial API group, a services API group, an outbound logistics API group, a research and development API group, a marketing API group and a human resources API group. These groupings are based on which database of the enterprise databases 170 where each API was discovered. These groupings do not correspond to the final classifications which may be determined by the API assessment component 160 at block 230.

Returning to FIG. 2, at decision block 220, the API discovery component 155 determines if more directories or network traffic are available for searching for more APIs. In terms of searching in previously known or newly identified directories for APIs, the decision at block 220 may be based simply on whether or not all the identified directories have been searched. In terms of searching network traffic, the determination may be based on a time schedule. For example, since network traffic is nearly always present, a positive determination may be made at block 220 (signifying that more discovery is warranted) during the scheduled time periods and a negative determination may result outside of the scheduled time periods.

If a positive determination for more API discovery is determined at block 220, the process 220 returns to block 210. If a negative determination is made at block 220, the process 200 continues to block 230.

At block 230, the API assessment component performs classification functions as described above. The assessment functions provide a framework for assessing what APIs have been found at block 210 and categorizing these APIs in order to automatically determine what types of APIs have been found and create a library, the R-AIR 140', automatically.

The information platform provided by the API assessment component 165 automates the creation of a taxonomy used for de-duplications of like services, securitization of data, and deprecating business capabilities, as described above. The taxonomy also acts as a knowledge base for the information platform to perform correlation and coordination useful to manage APIs. The following list summarizes some of the functions that may be performed during assessment of APIs at block 230:

Correlation Function: Clusters like API data for further analysis

De-duplication Function: Content rationalization, remove duplicate information to allow for further refinement Categorization: Identify best fit taxonomy categories combined with industry standards and best practices Coordination: Automated hyper linking allows common information to be linked together with the R-AIR 140 and the API store 115

Table 2 lists an example taxonomy that may be used during assessment at block 230. The categories shown in Table 1 were made available from Programmable Web at http://www.programmableweb.com/apitag/taxonomy. Table 1 also lists the number of APIs (in parentheses) that are in each category. Table 3 lists example results of an assessment analysis of three enterprises, Enterprise #1, Enterprise #2 and Enterprise #3. Table 3 indicates the presence of one or more APIs within the categories of the taxonomy of Table 2 within each of the Enterprises by an "X". Only the categories in which APIs were found are included in Table 3.

TABLE 2

API TAXONOMY CATEGORIES (NO. OF ENTRIES)

Advertising (219)
Answers (32)
Auctions (3)
Backend (108)
Blog Search (11)
Blogging (71)
Bookmarks (42)
Calendar (33)
Catalog (5)
Chat (54)
Database (99)
Dating (3)
Dictionary (23)
Education (199)
Email (203)
Enterprise (448)
Entertainment (81)
Events (99)
Fax (22)

TABLE 2-continued

API TAXONOMY CATEGORIES (NO. OF ENTRIES)

Feeds (47)
File Sharing (68)
Financial (458)
Food (66)
Games (163)
Goal Setting (7)
Government (314)
Internet (611)
Job Search (55)
Mapping (352)
Media Management (57)
Media Search (12)
Medical (128)
Messaging (301)
Music (195)
News (82)
Office (94)
Other (218)
Other Search (1)
Payment (290)
Photos (240)
PIM (35)
Politics (14)
Portal (1)
Project Management (135)
Real Estate (77)
Recommendations (67)
Reference (347)
Retail (72)
Science (317)
Search (238)
Security (194)
Shipping (89)
Shopping (340)
Social (503)
Sports (113)
Storage (100)
Tagging (17)
Telephony (288)
Tools (739)
Transportation (156)
Travel (206)
Utility (171)
Video (220)
Weather (76)
Widgets (36)
Wiki (17)

TABLE 3

X-CATEGORY PRESENT

| Category | Enterprise #1 | Enterprise #2 | Enterprise #3 |
|---|---|---|---|
| Advertising | X | | X |
| Backend | X | X | X |
| Blogs | X | | X |
| Bookmarking | | | |
| Calendar | | | X |
| Chat | | | X |
| Database | | | X |
| Email | | | X |
| Enterprise | | | X |
| Feeds | X | X | X |
| Financial | | | X |
| Government | | | X |
| Internet | | | X |
| Mapping | | | X |
| Office | | | X |
| Other | | | X |
| Payment | | | X |
| Photos | | X | X |
| PIM (Personal Information Manager) | | | X |
| Recommendations | | X | |
| Reference | | | X |
| Retail | | | X |
| Search | | | X |
| Shopping | | | X |
| Social | X | X | X |
| Storage | X | | X |
| Tools | X | | X |
| Utility | | | X |
| Widgets | | | X |

The categorization of the APIs of the Enterprises #1, #2 and #3 into the taxonomy of Table 1 may be accomplished using meaning-based computing. The meaning-based computing can access and filter both structured and unstructured data for context, relevance and value. Table 3 illustrates that Enterprises #1 and Enterprise #2 do not offer as many APIs as Enterprise #3. This comparison highlights the difference between the three enterprises. Such information may be used by Enterprise #1 and/or Enterprise #2 to target future development to remain competitive with Enterprise #3.

The assessment performed at block 230 may further expose business opportunities for an enterprise by assessing APIs and identifying what business opportunities existing APIs offer. The assessment may also be used to identify employees, partners, and suppliers that may use the APIs as well as how the APIs may be used by these individuals and groups and enterprises. This may make it easier for a supplier/vendor to provide and/or use APIs after all the contract information is finalized (governance, security, access, etc.).

Figure 5:
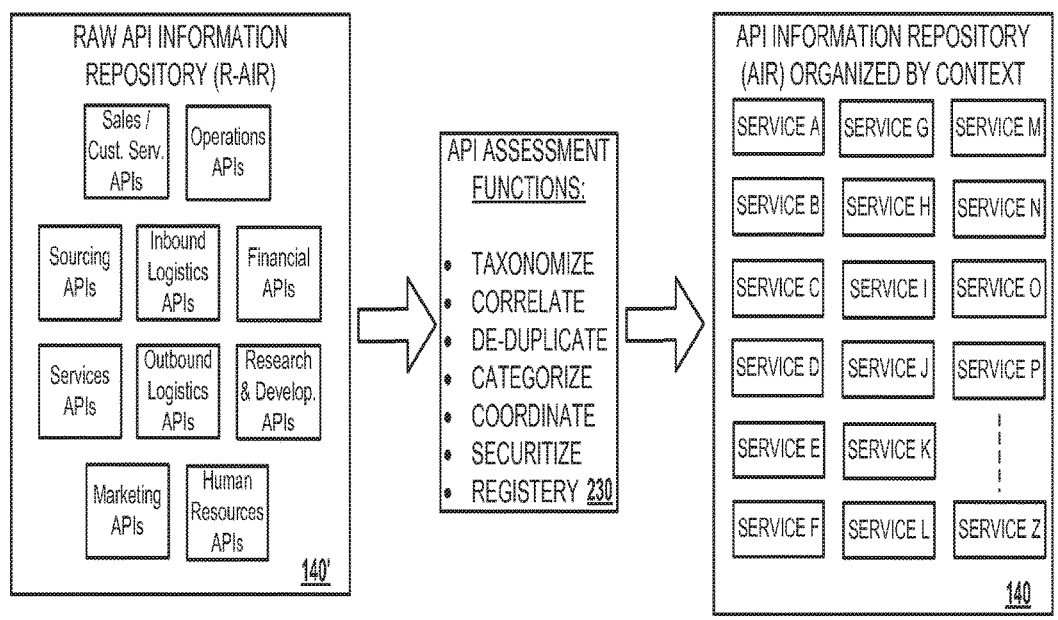
FIG. 5 illustrates example functions that may be performed during assessment of discovered APIs to form an API information repository.

FIG. 5 illustrates example functions that may be performed during assessment of discovered APIs to form an API information repository. The API assessment component 160 may start with the raw APIs discovered at block 210 that were stored in the R-AIR 140', apply one or more assessment functions including taxonomize, correlate, de-duplicate, categorize, coordinate, securitize and registry, as described above. After performing these functions, the AIR component 140 is populated with API services that may be organized by context, in contrast to the unorganized APIs in the R-AIR 140' that resulted from discovery at block 210.

Upon finishing the assessment functions at block 230, the process 200 may proceed to block 240 where the API management component 165 may perform the management functions such as, for example, access control (e.g., filtering traffic so only authenticated/authorized traffic gets through), rate limiting (e.g., restricting how much traffic can be sent by each external developer device 110 and/or internal development device 120 in association with each API), analytics/metrics capture and logging in the logging server component 130 (tracking what's going on with each of the APIs), security filtering (e.g., checking the content on incoming messages for attacks), and redirection/traffic routing (e.g., sending traffic to different endpoints in the infrastructure of the enterprise system 100 depending on the sender or the request). The API gateway 105 may utilize a set of modules and filters that treat the traffic as it flows through it at high speed and can typically enable those modules/filters and control their parameters. The assessment results/information can be used as manage services. For example, service settings such as security roles, transformations and throttling parameters may be determined based on the results of the assessment at block 230.

Figure 6:
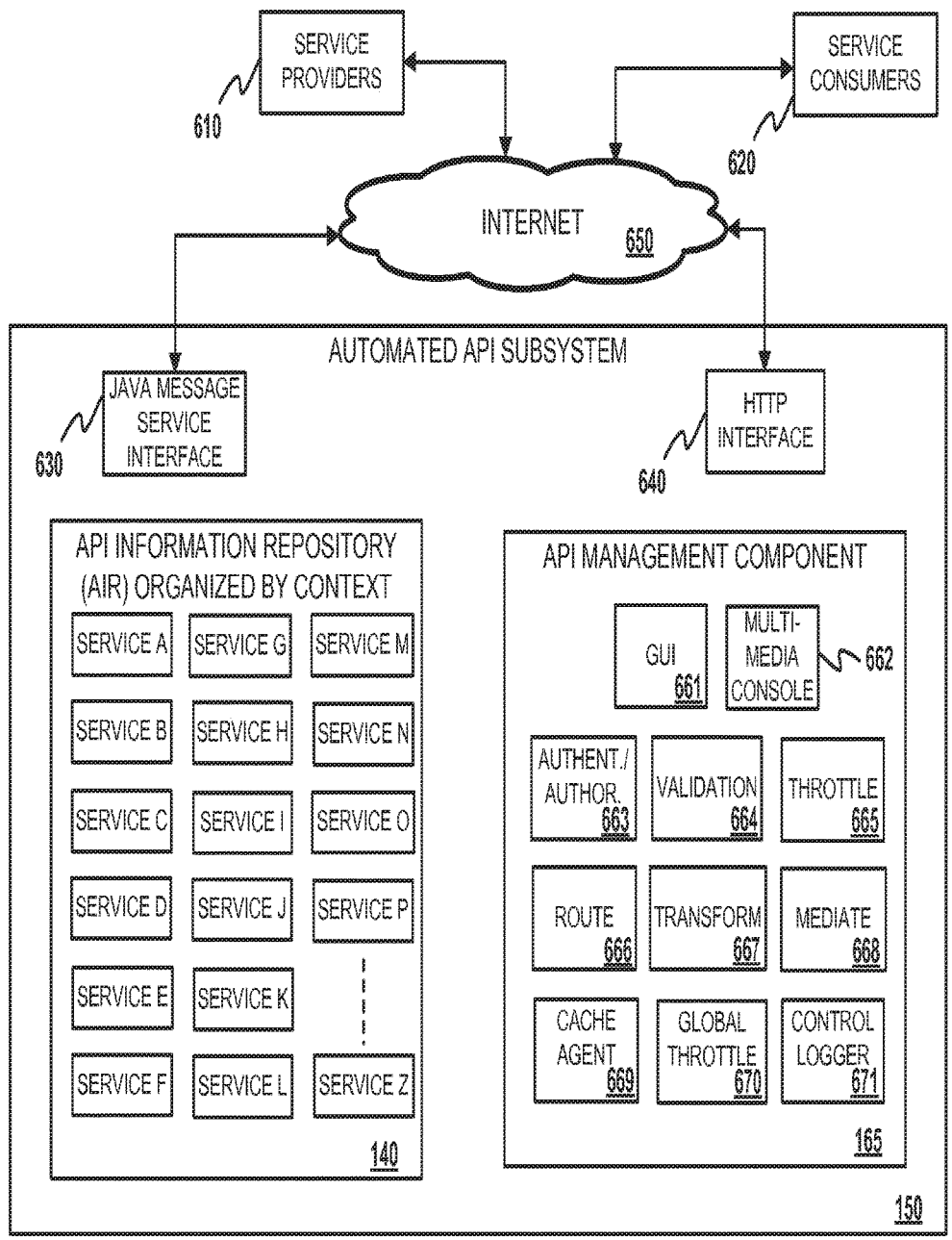
FIG. 6 illustrates example components that may be utilized for management of information in an API information repository.

FIG. 6 illustrates example components that may be utilized for management of information at block 240. A portion of the automated API subsystem 150 of FIG. 1 is illustrated in FIG. 6. The automated API subsystem 150 in FIG. 6 includes the API management component 165 and the AIR component 140. The AIR component 140 includes API services A, B, C through Z, in this example. The API services A-Z may have been identified by the discovery and assessment functions performed previously at blocks 210 and 230, respectively.

The API management component 165 includes various modules to perform the management functions described above. The automated API subsystem 150 is coupled to a network, such as the Internet 650, via one or more communication interfaces. In the example of FIG. 6, the communication interfaces include a JAVA ® message service interface 630 and a HTTP interface 640. Users, e.g., service consumers 620, and or developers, e.g., service providers 610 (which may be the external API developer devices 110 or the internal API developer devices 120), of the API services A-Z in the AIR component 140, may obtain access to the services A-Z in the AIR component 140 via one or both of the JAVA message service interface 630 and the HTTP interface 640.

The API management component 165 performs the management functions at block 240 to control the access to the API services A-Z using the various modules illustrated in FIG. 6. The API management component 165 includes a graphical user interface (GUI) 661 and a multimedia console 662 to enable the service providers 610 to interact with the development of the API services A-Z, and to allow the service consumers 620 to obtain copies of the API services A-Z via the API store 115, as will be described in reference to block 650 below.

Security functions may be provided by an authentication/authorization module 663 and a validation module 664. The throttling of traffic to limit how much interaction an individual user or a group of users have with an API may be provided by a throttle module 665. A global throttle module 670 may limit total interaction with one of the API services A-Z for all users.

A route module 666 may be used to deliver or provide access to the API services A-Z for the service providers 610 and/or the service consumers 620 via the internet 650. A transform module 667 may be used by the API management component to transform data into different formats that can be consumed by an end service or by a calling service. A mediate module 668 may allow the API management component 165 to provide conferencing services between two or more of the service providers 610 and or the service consumers 620 in order to cooperate in development of or use of the API services A-Z. A cache agent 669 may store previously provided answers to allow the API Gateway to respond without actually taxing a back end service for an answer if the API Gateway has already given that answer and stored it in memory of the cache agent 669.

The results from the assessment performed at block 230 may provide information which may be used by the API management component 165 to configure the API gateway 105 and the API store Monitoring and Analytics may be used to provide API usage statistics.

The authentication/authorization module 663 and the validation module 664 may develop authorization rules based on the API usage statistics to determine whose requests are permitted. The authentication/authorization module 663 and the validation module 664 may provide access control granularity down to single-edit configuration changes to specific API services A-Z.

The throttle module 665 and the global throttle module 670 may develop throttling models based on the API usage statistics to determine when requests are handled. The throttling models may vary based on change rate, high water mark, quota, time-of-day, error-rate/Payload-size, group logic, etc. Change policies and throttles can be extended with declarative rule language.

The route module 666 may utilized the API usage statistics to develop routing rules that determine where requests are handled. The routing rules may provide for single-edit configuration down to specific APIs, in-line transformation through configuration, and orchestration logic that may be hot-deployed.

The mediate module 668 may develop mediation models that determine how request are handled base on the API usage statistics. The mediation rules may include flow logic, transformation and validation logic, and caching logic.

Figure 7:
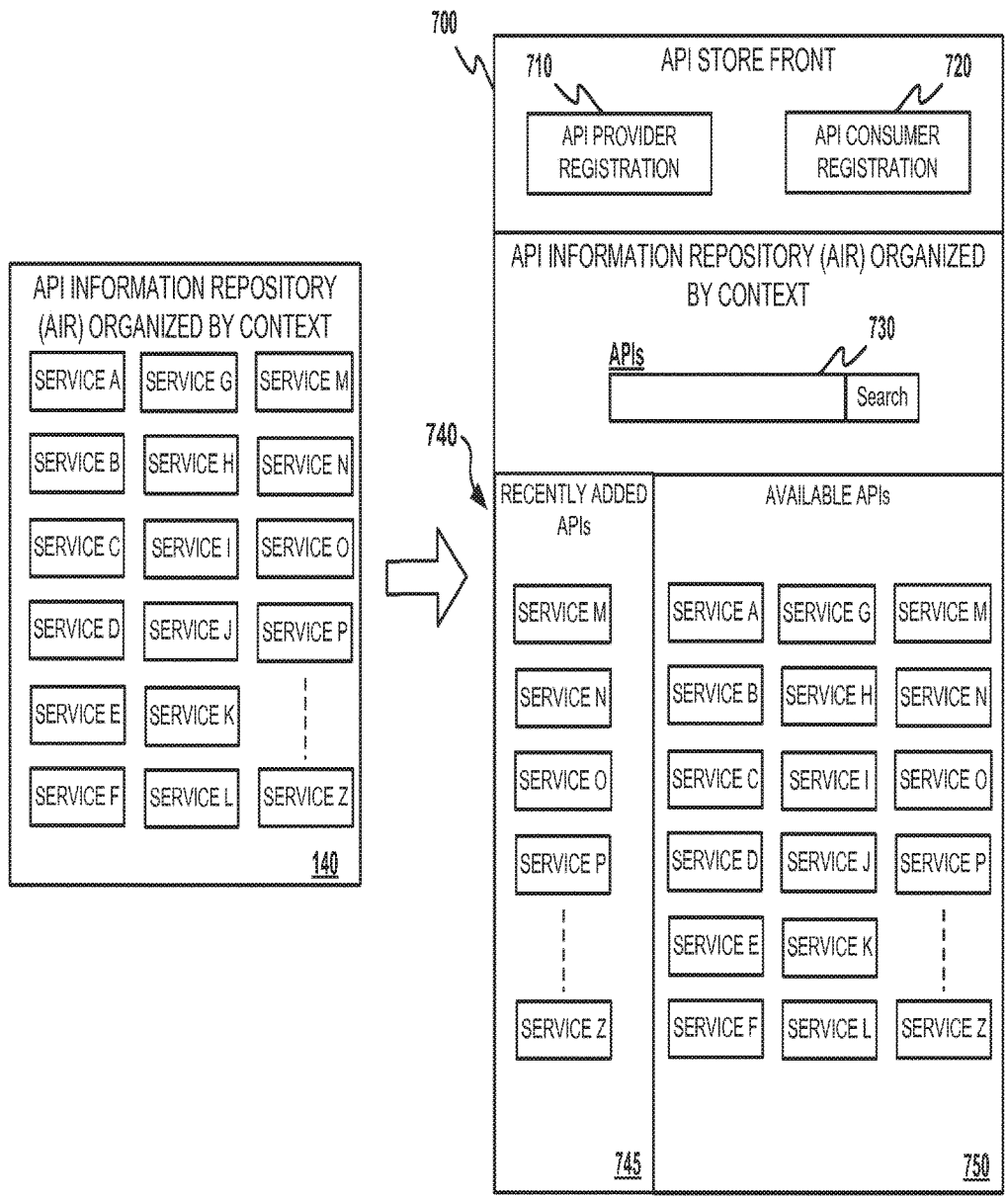
FIG. 7 illustrates an example API storefront webpage that may be provided to expose information in the API information repository.

At block 250, the API management component 165 may expose the API services A-Z of the AIR component 140 to individuals or groups including, but not limited to, employees or API developers, internal or external, to the enterprise system 100, suppliers, partners, etc. FIG. 7 illustrates an example API storefront webpage 700 that may be provided to expose information in the API information repository. The example API webpage 700 bay be used in conjunction with the API store 115 in FIG. 1 as described above.

The API webpage 700 may be controlled and maintained by the API management component 165. The API webpage 700 may include an API provider registration input 710 to allow API developers such as the service providers 610 of FIG. 6, and/or the external or internal developer devices 110 and 120 of FIG. 1 to gain authorized access to the API webpage 700. The API webpage 700 may also include an API consumer registration input 720 to allow API consumer devices such as the service consumers 620 of FIG. 6 to gain authorized access to the API webpage 700.

The API webpage 700 also includes an API search input portion 730. The API search input portion 730 may be used to search for specific APIs by name, technical category, serial number, etc. Links to the previously discovered and assessed API services A-Z of the AIR component 140 may be displayed in a contextually organized API listing portion 740. The contextually organized API listing portion 740 may include a recently added API list 745 that lists only those APIs newly added to the contextually organized API listing portion 740. The contextually organized API listing portion 740 may also include a complete API list 750 listing all available API services A-Z.

The API webpage 700 is example only and the API store 115 may provide access to APIs via different technologies other than a webpage. In addition, an API webpage may include different services and display mechanisms for exposing the APIs.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
a processor; and
a memory on which is stored machine readable instructions that are to cause the processor to:
employ a plurality of different search strategies to search a plurality of storage environments of an enterprise to discover application programming interfaces (APIs) associated with the enterprise;
classify the discovered APIs according to a taxonomy of API contexts and store at least a portion of the classified APIs in an API information repository;
group duplicate APIs of the discovered APIs that are assessed to perform similar functions;
analyze the duplicate APIs to determine a usage of each API of the duplicate APIs; and
provide user devices with authorized access to the classified APIs in the API information repository via an API gateway.

2. The system of claim 1, wherein the instructions are further to cause the processor to monitor network traffic to identify signatures indicative of previously unknown directories to search for APIs and search the previously unknown directories for APIs.

3. The system of claim 1, wherein information indicative of search criteria of the plurality of different search strategies is stored in a plurality of search cartridge files and the instructions are further to cause the processor to feed the search cartridge files into a plurality of different search tools to discover the APIs.

4. The system of claim 1, wherein the instructions are further to cause the processor to classify the discovered APIs by correlating functions performed by the discovered APIs with functions stored in association with API categories in the taxonomy.

5. The system of claim 1, wherein the instructions are further to cause the processor to populate an API store webpage with links to the classified APIs to provide the authorized access.

6. The system of claim 1, wherein the searched plurality of storage environments include databases internal to the enterprise and databases external to the enterprise.

7. The system of claim 1, wherein the instructions are further to cause the processor to de-duplicate the discovered APIs by deleting at least one of a plurality of APIs that are assessed to perform similar functions and that have less usage than a respective duplicate API.

8. The system of claim 1, wherein the instructions are further to cause the processor to limit how much interaction an individual user or a group of users have with an API.

9. A method, comprising:
searching, by a processor, a plurality of storage environments of an enterprise to discover application programming interfaces (APIs) associated with an enterprise by employing a plurality of different search strategies;
classifying, by the processor, the discovered APIs according to a taxonomy of API contexts and storing at least a portion of the classified APIs in an API information repository;
grouping, by the processor, duplicate APIs of the discovered APIs that are assessed to perform similar functions;
analyzing, by the processor, the duplicate APIs to determine a usage of each API of the duplicate APIs; and
providing, by the processor, user devices with authorized access to the classified APIs in the API information repository via an API gateway.

10. The method of claim 9, wherein searching the plurality of storage environments comprises monitoring network traffic to identify signatures indicative of previously unknown directories to search for APIs and search the previously unknown directories for APIs.

11. The method of claim 9, wherein information indicative of search criteria of the plurality of different search strategies is stored in a plurality of search cartridge files and wherein searching the plurality of storage environments comprises feeding the search cartridge files into a plurality of different search tools to discover the APIs.

12. The method of claim 9, wherein classifying the discovered APIs comprises correlating functions performed by the discovered APIs with functions stored in association with API categories in the taxonomy.

13. A non-transitory computer readable medium on which is stored machine readable instructions that when executed by a processor, cause the processor to:
search a plurality of storage environments of an enterprise to discover application programming interfaces (APIs) associated with an enterprise by employing a plurality of different search strategies;
classify the discovered APIs according to a taxonomy of API contexts and storing at least a portion of the classified APIs in an API information repository;
group duplicate APIs of the discovered APIs that are assessed to perform similar functions;
analyze the duplicate APIs to determine a usage of each API of the duplicate APIs; and
provide user devices with authorized access to the classified APIs in the API information repository via an API gateway.

14. The non-transitory computer readable medium of claim 13, wherein the instructions are further to cause the apparatus to search a plurality of storage environments by monitoring network traffic to identify signatures indicative of previously unknown directories to search for APIs and search the previously unknown directories for APIs.

15. The non-transitory computer readable medium of claim 13, wherein information indicative of search criteria of the plurality of different search strategies is stored in a plurality of search cartridge files and wherein the instructions are further to cause the processor to search a plurality of storage environments by feeding the search cartridge files into a plurality of different search tools to discover the APIs.

\* \* \* \* \*